US012667840B2

(12) United States Patent
Beebe et al.

(10) Patent No.: US 12,667,840 B2
(45) Date of Patent: Jun. 30, 2026

(54) DEVICE AND METHOD FOR ACCELERATED MATERIAL EXTRACTION AND DETECTION

(71) Applicant: Wisconsin Alumni Research Foundation, Madison, WI (US)

(72) Inventors: David J. Beebe, Monona, WI (US); Duane S. Juang, Madison, WI (US); Terry D. Juang, Madison, WI (US); Thomas C. Friedrich, Madison, WI (US); David H. O'Connor, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 19/062,154

(22) Filed: Feb. 25, 2025

(65) Prior Publication Data

US 2025/0196134 A1 Jun. 19, 2025

Related U.S. Application Data

(62) Division of application No. 16/894,273, filed on Jun. 5, 2020, now Pat. No. 12,269,031.

(51) Int. Cl.
| | |
|---|---|
| *B01L 3/00* | (2006.01) |
| *G01N 35/10* | (2006.01) |
| *G01N 35/00* | (2006.01) |

(52) U.S. Cl.
CPC ....... *B01L 3/502715* (2013.01); *B01L 3/5021* (2013.01); *B01L 3/523* (2013.01); *G01N 35/1072* (2013.01); *B01L 2200/028* (2013.01);

*B01L 2200/0631* (2013.01); *B01L 2200/0647* (2013.01); *G01N 2035/00277* (2013.01)

(58) Field of Classification Search
CPC ............ B01L 3/0241; B01L 3/502746; B01L 3/502761; B01L 2200/0647; B01L 2200/0668; B01L 2300/0851; B01L 2400/043; B03C 1/01; B03C 2201/18; G01N 33/5432; G01N 33/54326
See application file for complete search history.

(56) References Cited

U.S. PATENT DOCUMENTS

| | | | | |
|---|---|---|---|---|
| 2013/0288254 A1* | 10/2013 | Pollack | ................ | G01N 27/447 |
| | | | | 435/6.12 |
| 2018/0162901 A1* | 6/2018 | Beebe | .................... | C07K 1/145 |
| 2021/0379587 A1* | 12/2021 | Beebe | .................... | B01L 3/523 |

* cited by examiner

*Primary Examiner* — Charles Capozzi
*Assistant Examiner* — Dwayne K Handy
(74) *Attorney, Agent, or Firm* — Boyle Fredrickson, S.C.

(57) ABSTRACT

A method and device are provided for detecting a target in a biological sample. The target binds to a solid phase substrate. First and second cavities in a plate are filled with an oil. The first and second cavities are in fluid communication with each other. The solid phase substrate is magnetically drawn sequentially from a drop of the biological sample in the first cavity, through the oil, into a drop of the reaction solution in the second cavity. A change in a parameter of the drop of the reaction solution indicates the presence of the target.

17 Claims, 6 Drawing Sheets

DEVICE AND METHOD FOR ACCELERATED MATERIAL EXTRACTION AND DETECTION

CROSS-REFERENCE TO RELATED APPLICATION

This application is a division of U.S. application Ser. No. 16/894,273, filed Jun. 5, 2020, the entirety of which is incorporated herein by reference.

REFERENCE TO GOVERNMENT GRANT

This invention was made with government support under CA247479, OD011106 and TR002373 awarded by the National Institutes of Health. The government has certain rights in the invention.

FIELD OF THE INVENTION

This invention relates generally to diagnostic testing, and in particular, to a device and method for the accelerated extraction and detection of a target, e.g., genetic material (DNA/RNA), for use as a diagnostic biomarker.

BACKGROUND AND SUMMARY OF THE INVENTION

As testing laboratories attempt to scale up existing protocols for SARS-COV-2 testing, a number of shortcomings have emerged. These shortcomings include supply chain problems (e.g. lack of available RNA extraction kits and specialized equipment), the cost, time and/or effort required for the current test protocols and the relatively low throughput of nonautomated systems. Supply chain issues may be reduced, but not eliminated, as companies ramp up their production. However, the cost, time and/or effort required for the current test protocols and the throughput challenges are inherent in current testing methods. Hence, despite best efforts, it is clear that test availability and throughput do not meet current demands.

The current gold standard method for COVID-19 testing is a multi-step protocol involving RNA extraction using column-based or magnetic bead-based methods, followed by RT-qPCR-based detection of the extracted RNA. Unless automated platforms are employed, this extraction process is lengthy and laborious involving 1) mixing the sample with lysis/binding buffer and vortexing; 2) column-based or magnetic-bead-based capture of the viral RNA; 3) multiple washes (generally two to three washes) involving centrifugation or magnetic separation for each wash; 4) elution of viral RNA; 5) aspirating the eluted RNA and pipetting it into a PCR plate loaded with RT-qPCR master mix; and 6) placing the PCR plate in a specialized fluorescent qPCR instrument to run thermocycling and data capture. This process usually takes 3~4 hours and is hard to scale because: 1) the RNA extraction process is time consuming due to the multiple pipetting and centrifugation/magnetic separation steps for washing; and 2) the RT-qPCR process itself takes approximately one (1) hour with continuous "real-time" fluorescence measurements at each cycle. Since most machines are designed to handle one plate at a time, the turnaround time is significantly limited. Although there have been efforts to develop immunoassay-based tests such as lateral flow "pregnancy type" tests for COVID-19, most lack sufficient accuracy (sensitivity/specificity) to be deployed for broad testing.

Therefore, it is a primary object and feature of the present invention to provide a device and method for the accelerated extraction and detection of genetic material (DNA/RNA) for use as a diagnostic biomarker.

It is a further object and feature of the present invention to provide a device and method for the accelerated extraction and detection of genetic material (DNA/RNA) for use as a diagnostic biomarker which reduces the cost, effort, complexity and reagent consumption associated with prior devices/methods, while increasing the throughput and speed over these prior devices/methods.

It is a further object and feature of the present invention to provide a device and method for the accelerated extraction and detection of genetic material (DNA/RNA) for use as a diagnostic biomarker which does not add to current supply chain problems associated with the lack of availability of RNA extraction kits.

It is a still further object and feature of the present invention to provide a device and method for the accelerated extraction and detection of genetic material (DNA/RNA) for use as a diagnostic biomarker which is compatible with instruments currently present in most clinical laboratories.

In accordance with the present invention, a device is provided for detecting a target in a biological sample. The target binds to a solid phase substrate. The device includes a plate having upper and lower surfaces. First, second and third spaced wells are provided in the plate. Each of the first, second and third spaced wells define corresponding cavities which are fluidly connected and have dimensions. A first collar projects from the upper surface of the plate and defines a non-circular opening in communication with the cavity defined by the second well. A magnetic manipulation plate includes an upper surface defining a microfluidic plate receipt cavity for removably receiving the plate therein. The plate is slidable within the microfluidic plate receipt cavity between a first binding position, a second position and a third detection position. A magnetic force generator generates a magnetic force for attracting the solid phase substrate. The magnetic force generator is axially aligned with: 1) the cavity defined by the first well with the plate in the first binding position; 2) the cavity defined by the second well with the plate in the second position; and 3) the cavity defined by the third well with the plate in the third detection position.

It is contemplated for oil to be received in the cavities of the first, second and third wells and for a drop of a aqueous solution received in the cavity defined by the second well and a drop of amplification reaction solution (e.g., RT-LAMP or qRT-PCR reagents) in the cavity defined by the third well. The cavity defined by the first well is adapted for receiving a drop of the biological sample including solid phase substrate therein, the solid phase substrate being attracted to the magnetic force generated by the magnet with the plate in the first binding position. The magnetic generator draws the solid phase substrate from the drop of the biological sample, through the oil and into the drop of the aqueous solution as the plate moves from the first binding position to the second position. The magnetic generator draws the solid phase substrate from the drop of the aqueous solution, through the oil and into the drop of reaction solution as the plate moves from the second position to the third detection position.

It is contemplated for the drop of aqueous solution and the oil to have a first interfacial tension, the drop of aqueous solution and the plate to have a second interfacial tension, and the oil and the plate to have a third interfacial tension. The second interfacial tension is greater than or equal to the sum of the first interfacial tension and the third interfacial tension, thereby giving rise to liquid repellency between the drop of aqueous solution and the plate. The drop of reaction solution and the oil has a fourth interfacial tension and the drop of reaction solution and the plate has a fifth interfacial tension. The fifth interfacial tension is greater than or equal to the sum of the fourth interfacial tension and the third interfacial tension, thereby giving rise to liquid repellency between the drop of reaction solution and the plate. The drop of the biological sample and the oil has a sixth interfacial tension and the drop of the biological sample and the plate has a seventh interfacial tension. The seventh interfacial tension is greater than or equal to the sum of the sixth interfacial tension and the third interfacial tension, thereby giving rise to liquid repellency between the drop of the biological sample and the plate.

The plate may include a fourth well defining a cavity. The fourth well is disposed between and is in fluid communication with the cavities in the second and third wells. The oil may be received in the cavities of the first, second, third and fourth wells. A drop of a first aqueous solution is received in the cavity defined by the second well, a drop of a second aqueous solution is received in the cavity defined by the fourth well, and a drop of reaction solution in the cavity defined by the third well.

The plate may include a second collar projecting from the upper surface of the plate and defining a non-circular opening in communication with the cavity defined by the third well. The dimension of the cavity defined by the first well is greater than the dimensions of the cavities defined by the second and third spaced wells. The first, second and third wells are hydrophobic In accordance with a further aspect of the present invention, a method is provided for detecting a target in a biological sample. The target binds to a solid phase substrate. The method includes the steps providing a plate having first and second cavities in fluid communication with each other. The first and second cavities are filled with an oil and a drop of the biological sample with the solid phase substrate is deposited in the first cavity. A drop of a reaction solution is deposited in the second cavity. The solid phase substrate in the drop of the biological sample is magnetically drawn through the oil and into the reaction solution. The target is detected in the drop of the reaction solution.

The drop of reaction solution and the oil have a first interfacial tension, the drop of reaction solution and the plate have a second interfacial tension, and the oil and the plate have a third interfacial tension. The second interfacial tension is greater than or equal to the sum of the first interfacial tension and the third interfacial tension, thereby giving rise to liquid repellency between the drop of reaction solution and the plate. The drop of the biological sample and the oil have a fourth interfacial tension and the drop of the biological sample and the plate have a fifth interfacial tension. The fifth interfacial tension is greater than or equal to the sum of the fourth interfacial tension and the third interfacial tension, thereby giving rise to liquid repellency between the drop of the biological sample and the plate.

The method may include the additional steps of obtaining sample cells from a subject and depositing the sample cells in a lysis solution to free the target from the sample cells. The solid phase substrate is deposited in the lysis solution such that the target binds to the solid phase substrate. A portion of the lysis solution including at least a portion of the solid phase substrate defines the drop of the biological sample.

A collar may be provided about an opening in communication with one of the cavities in the plate. The opening is non-circular. The step of detecting the target in the drop of the reaction solution may include the additional steps of releasing the target from the solid phase substrate and removing the solid phase substrate from the drop of the reaction solution. The drop of the reaction solution may be after the target are released from the solid phase substrate. A change of a property of the drop of reaction solution may be detected after heating.

A third cavity in the plate may be filled with the oil and a drop of an aqueous solution deposited in the third cavity. The solid phase substrate is passed through the drop of the aqueous solution prior to drawing the solid phase substrate into the drop of the reaction solution. The aqueous solution may be a first aqueous solution and the method may include the additional steps of filling a fourth cavity in the plate with the oil and depositing a drop of a second aqueous solution in the fourth cavity. The solid phase substrate is passed through the drop of the second aqueous solution prior to drawing the solid phase substrate into the drop of the reaction solution.

In accordance with a still further aspect of the present invention, a method is provided for detecting a target in a biological sample. The target binds to a solid phase substrate. The method includes the step of filling first and second cavities in a plate with an oil. The first and second cavities are in fluid communication with each other. The solid phase substrate is magnetically drawn sequentially from a drop of the biological sample in the first cavity, through the oil, into a drop of reaction solution in the second cavity. The target is detected in the drop of the reaction solution.

The method may also include the steps of obtaining at least one sample cell from a subject and depositing the at least one sample cell in a lysis solution to free the target from the at least one sample cell. The solid phase substrate is deposited in the lysis solution such that the target binds to the solid phase substrate. A portion of the lysis solution including at least a portion of the solid phase substrate defines the drop of the biological sample.

A collar may be provided about an opening in communication with one of the second and third cavities in the plate. The opening is non-circular. The step of detecting the target in the drop of the reaction solution may include the additional steps of releasing the target from the solid phase substrate and removing the solid phase substrate from the drop of the reaction solution. The drop of the reaction solution may be heated after the target are released from the solid phase substrate. A change of a property of the drop of reaction solution may be detected after heating.

A third cavity in the plate may be filled with the oil and a drop of an aqueous solution deposited in the third cavity. The solid phase substrate is passed through the drop of the aqueous solution prior to drawing the solid phase substrate into the drop of the reaction solution. The aqueous solution may be a first aqueous solution and the method may include the additional steps of filling a fourth cavity in the plate with the oil and depositing a drop of a second aqueous solution in the fourth cavity. The solid phase substrate is passed through the drop of the second aqueous solution prior to drawing the solid phase substrate into the drop of the reaction solution.

The drop of reaction solution and the oil have a first interfacial tension, the drop of reaction solution and the plate have a second interfacial tension, and the oil and the plate have a third interfacial tension. The second interfacial tension is greater than or equal to the sum of the first interfacial tension and the third interfacial tension, thereby giving rise to liquid repellency between the drop of reaction solution and the plate. The drop of the biological sample and the oil have a fourth interfacial tension and the drop of the biological sample and the plate have a fifth interfacial tension. The fifth interfacial tension is greater than or equal to the sum of the fourth interfacial tension and the third interfacial tension, thereby giving rise to liquid repellency between the drop of the biological sample and the plate.

BRIEF DESCRIPTION OF THE DRAWINGS

The drawings furnished herewith illustrate a preferred methodology of the present invention in which the above advantages and features are clearly disclosed as well as others which will be readily understood from the following description of the illustrated embodiment.

In the drawings.

DETAILED DESCRIPTION OF THE DRAWINGS

Figure 1:
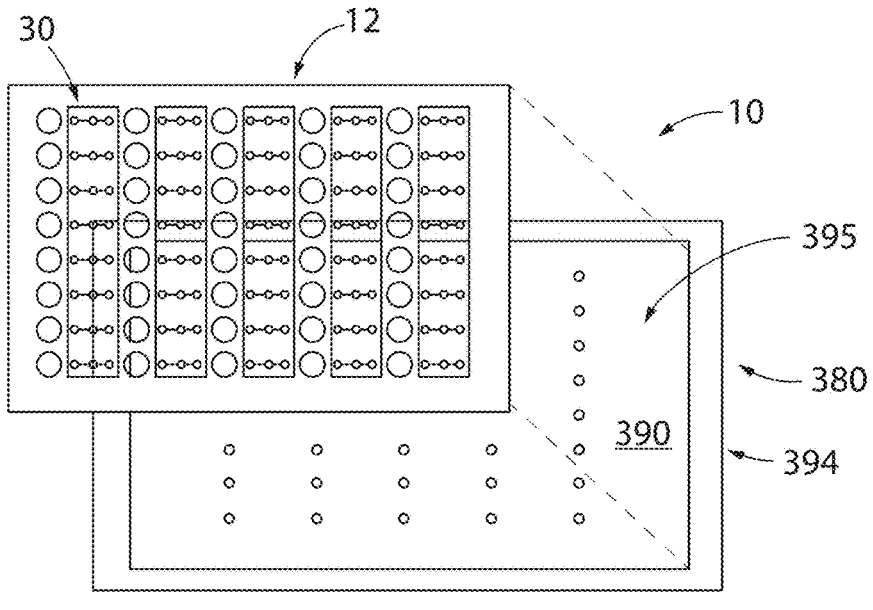
FIG. 1 is an exploded, schematic view of a system for effectuating the methodology of the present invention.
Figure 2:
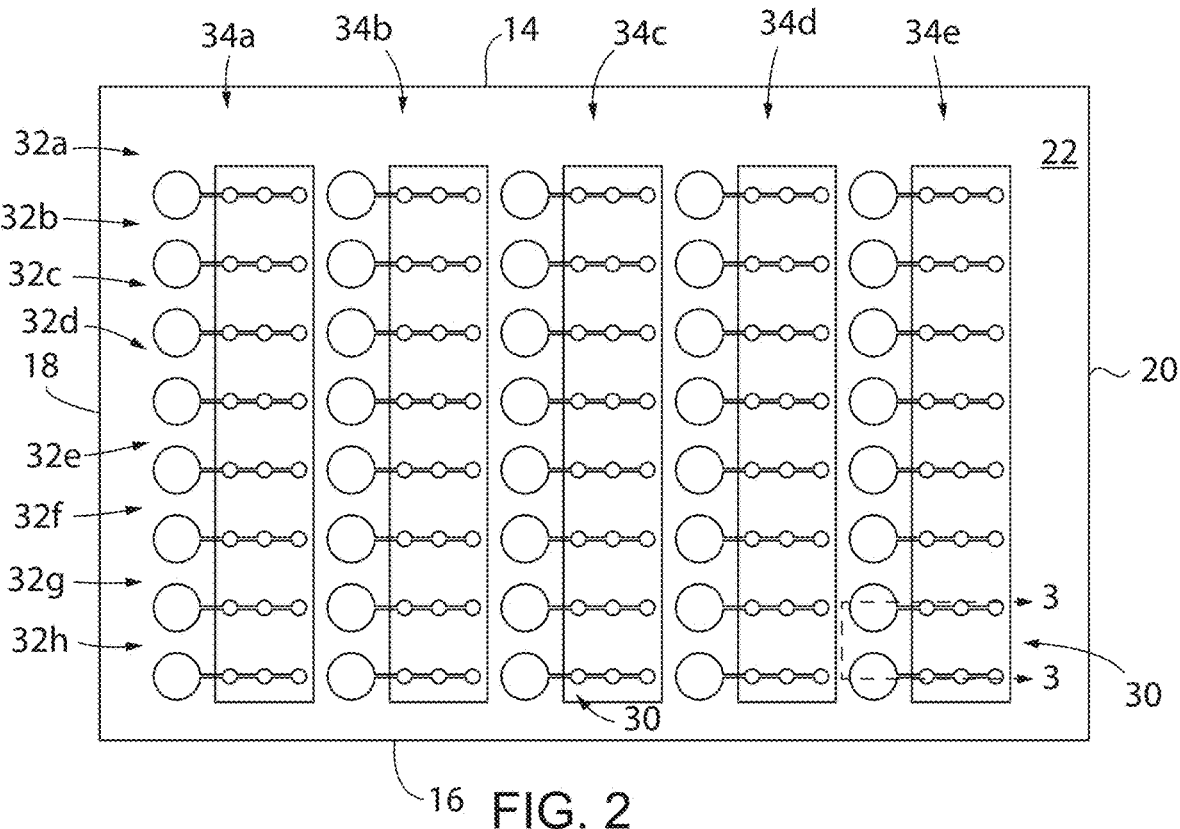
FIG. 2 is a top plan view of microfluidic plate of the system of the present invention.
Figure 3:
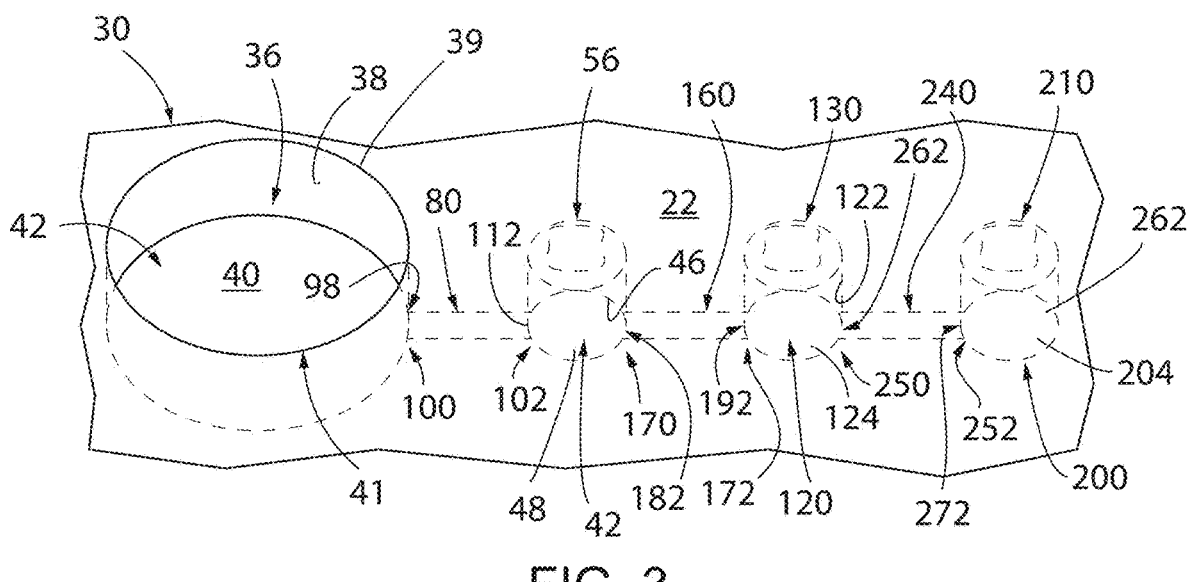
FIG. 3 is an isometric view of an individual extraction/detection device on the microfluidic plate of FIG. 2.
Figure 4:
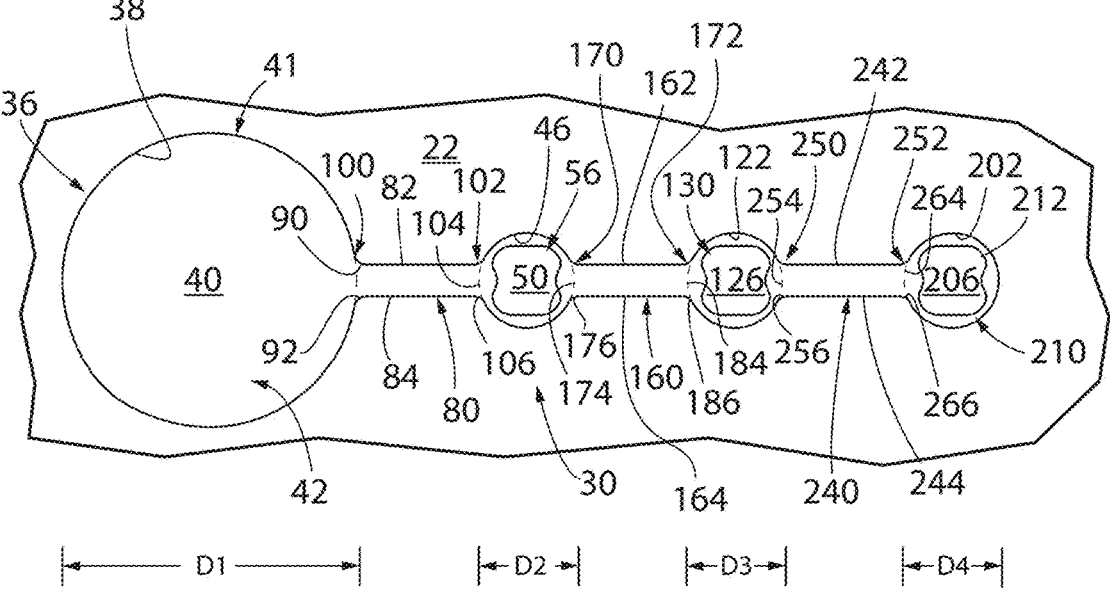
FIG. 4 is a top plane view of the individual extraction/detection device of FIG. 3.

Referring to FIG. 1, a schematic drawing depicting a system for effectuating the methodology of the present invention is generally designated by the reference numeral 10. As best seen in FIGS. 2-6, system 10 includes microfluidic plate 12 defined by first and second generally parallel, spaced side walls 14 and 16, respectively, interconnected by first and second generally parallel, spaced end walls 18 and 20, respectively. First and second side walls 14 and 16 respectively, and first and second end walls 18 and 20, respectively, are interconnected by upper and lower surfaces 22 and 24, respectively. In order to effectuate the methodology of the present invention, it is highly desirable for each surface of microfluidic plate 12 to be a hydrophobic solid surface having specific surface chemical and physical conditions intended to repel aqueous solutions, as hereinafter described.

As hereinafter described, microfluidic plate 12 includes a plurality of extraction/detection devices 30 arranged therein. By way of example, the plurality of extraction/detection devices 30 in microfluidic plate 12 are arranged in eight (8) rows 32a-32h and five (5) columns 34a-34e. However, the number and arrangement of the plurality of extraction/detection devices 30 in microfluidic plate 12 may be varied without deviating from the scope of the present invention. Further, it is noted that it is contemplated for each of the plurality of extraction/detection devices 30 provided in microfluidic plate 12 to be identical in structure. As such, the description hereinafter of extraction/detection device 30 at the intersection of row 32h and column 34e is understood to describe each of the plurality of extraction/detection devices 30, as if fully described herein.

Extraction/detection device 30 at the intersection of row 32h and column 34e includes a first, binding well 36 defined by a generally circular sidewall 38 and closed bottom wall 40. Sidewall 38 and bottom wall 40 define binding cavity 42 having a diameter D1 for receiving a sample therein, as hereinafter described. Upper edge 39 of sidewall 38 intersects upper surface 22 of microfluidic plate 12 and defines opening 41 which provides access to binding cavity 42. While binding well 36 has a generally circular configuration in the depicted embodiment, other configurations are contemplated without deviating from the scope of the present invention.

Extraction/detection device 30 at the intersection of row 32h and column 34e includes further includes second well 44 downstream of binding well 36 and being defined by a generally circular sidewall 46 and bottom wall 48. Sidewall 46 and bottom wall 48, respectively, define second cavity 50, having a diameter D2 less than diameter D1 of binding cavity 42, in microfluidic plate 12, FIG. 4. Again, although second well 44 has a generally rectangular configuration in the depicted embodiment, other configurations are contemplated without deviating from the scope of the present invention.

Figures 5, 6:
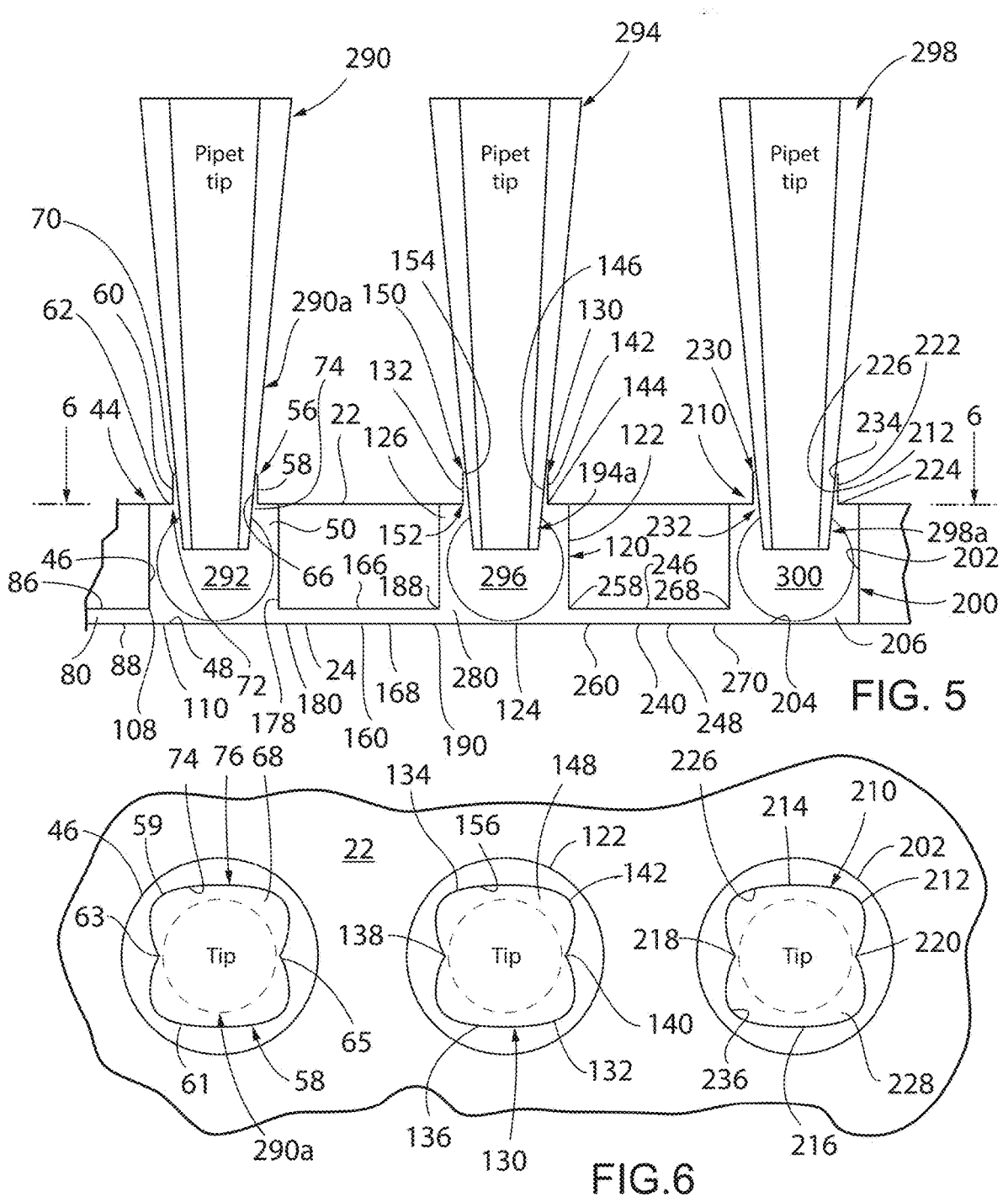
FIG. 5 cross-sectional view showing the filling of selected cavities of the individual extraction/detection device of FIG. 3.
FIG. 6 is a cross-sectional view showing the filling of selected cavities of the individual extraction/detection device taken along line 6-6 of FIG. 5.

Collar 56 projects from upper surface 22 of microfluidic plate 12 and overlaps opening 54. Collar 56 is defined by sidewall 58 having a non-circular configuration. In the depicted embodiment, sidewall 58 has a configuration similar to a figure eight, but other configurations are possible without deviating from the scope of the present invention. More specifically, sidewall 58 includes first and second loop portions 59 and 61, respectively, which intersect each other at first and second opposing intersections 63 and 65, respectively. Sidewall 58 includes outer surface 60 having lower edge 62 intersecting upper surface 22. Inner surface 66 of sidewall 58 defines passage 68 between upper and lower ends 70 and 72, respectively, thereof. Upper edge 74 of inner surface 66 of sidewall 58 defines opening 76 in collar 56 so as to allow access to second cavity 50 through passage 68. As best seen in FIG. 6, the diameter of opening 76 and passage 68 defined by sidewall 58 is reduced between first and second intersections 63 and 65, respectively, for reasons hereinafter described.

Binding well 12 and second well 44 are interconnected by first channel 80 that extends along an axis and is defined by first and second sidewalls 82 and 84, respectively, upper wall 86 and bottom wall 88. First channel 80 has a first end 100 communicating with binding cavity 42 and an opposite, second end 102 communicating with second cavity 50. More specifically, upstream ends 90 and 92 of first and second sidewalls 82 and 84, respectively, of first channel 80, upstream end 94 of upper wall 86 and upstream end 96 of bottom wall 88 define opening 98 in first end 100 of first channel 80 that allows binding well 36 to communicate with first channel 80. Similarly, downstream ends 104 and 106 of first and second sidewalls 82 and 84, respectively, of first channel 80, downstream end 108 of upper wall 86 and downstream end 110 of bottom wall 88 define opening 112 in second end 102 of first channel 80 so as to allow first channel 80 to communicate with second cavity 50. Bottom wall 88 of first channel 80 is generally co-planar with bottom walls 40 and 48 of binding well 36 and second well 44, respectively.

Extraction/detection device 30 at the intersection of row 32h and column 34e also includes third well 120 downstream of binding well 36 and second well 44. Third well 120 is defined by a generally circular sidewall 122 and bottom wall 124. Sidewall 122 and bottom wall 124 define third cavity 126, having a diameter D3 less than diameter D1 of binding cavity 42, in microfluidic plate 12, FIG. 4. Although third well 120 has a generally circular configuration in the depicted embodiment, other configurations are contemplated without deviating from the scope of the present invention.

Collar 130 projects from upper surface 22 of microfluidic plate 12 and overlaps third well 120. Collar 130 is defined by sidewall 132 having a configuration in a non-circular configuration. In the depicted embodiment, sidewall 132 has a configuration similar to a figure eight, but other configurations are possible without deviating from the scope of the present invention. More specifically, sidewall 132 includes first and second loop portions 134 and 136, respectively, which intersect each other at first and second opposing intersections 138 and 140, respectively. Sidewall 132 includes outer surface 142 having lower edge 144 intersecting upper surface 22 of microfluidic plate 12. Inner surface 146 of sidewall 132 defines passage 148 between upper and lower ends 150 and 152, respectively, thereof. Upper edge 154 of inner surface 146 of sidewall 132 defines opening 156 in collar 130 that allows access to third cavity 126 through passage 148. As best seen in FIG. 6, the diameter of opening 156 and passage 148 defined by sidewall 132 is reduced between first and second intersections 138 and 140, respectively, for reasons hereinafter described.

Second and third wells 44 and 120, respectively, are interconnected by second channel 160 that extends along an axis and is defined by first and second sidewalls 162 and 164, respectively, upper wall 166 and bottom wall 168. Second channel 160 has a first end 170 communicating with second cavity 50 and an opposite, second end 172 communicating with third cavity 126. More specifically, upstream ends 174 and 176 of first and second sidewalls 162 and 164, respectively, of second channel 160, upstream end 178 of upper wall 166 and upstream end 180 of bottom wall 168 define opening 182 in first end 170 of second channel 160 that allows second cavity 50 to communicate with second channel 160. Similarly, downstream ends 184 and 186 of first and second sidewalls 162 and 164, respectively, of second channel 160, downstream end 188 of upper wall 166 and downstream end 190 of bottom wall 168 define opening 192 in second end 172 of second channel 160 so as to allow second channel 160 to communicate with third cavity 126. Bottom wall 168 of second channel 160 is generally co-planar with bottom walls 48 and 124 of second well 44 and third well 120, respectively.

Extraction/detection device 30 at the intersection of row 32h and column 34e also includes fourth, detection well 200 downstream of binding well 36, second well 44 and third well 120. Detection well 200 is defined by a generally circular sidewall 202 and bottom wall 204. Sidewall 202 and bottom wall 204 define detection cavity 206, having a diameter D4 less than diameter D1 of binding cavity 42, in microfluidic plate 12. Although third well 200 has a generally circular configuration in the depicted embodiment, other configurations are contemplated without deviating from the scope of the present invention.

Collar 210 projects from upper surface 22 of microfluidic plate 12 and overlaps detection well 200. Collar 210 is defined by sidewall 212 having a non-circular configuration. In the depicted embodiment, sidewall 212 has a configuration similar to a figure eight, but other configurations are possible without deviating from the scope of the present invention. More specifically, sidewall 212 includes first and second loop portions 214 and 216, respectively, which intersect each other at first and second opposing intersections 218 and 220, respectively. Sidewall 212 includes outer surface 222 having lower edge 224 intersecting upper surface 22 of microfluidic plate 12. Inner surface 226 of sidewall 212 defines passage 228 between upper and lower ends 230 and 232, respectively, thereof. Upper edge 234 of inner surface 226 of sidewall 212 defines opening 236 in collar 210 that allows access to detection cavity 206 through passage 228. As best seen in FIG. 6, the diameter of opening 236 and passage 228 defined by sidewall 212 is reduced between first and second intersections 218 and 220, respectively, for reasons hereinafter described.

Third and detection wells 120 and 200, respectively, are interconnected by third channel 240 that extends along an axis and is defined by first and second sidewalls 242 and 244, respectively, upper wall 246 and bottom wall 248. Third channel 240 has a first end 250 communicating with third cavity 126 and an opposite, second end 252 communicating with detection cavity 206. More specifically, upstream ends 254 and 256 of first and second sidewalls 242 and 244, respectively, of third channel 240, upstream end 258 of upper wall 246 and upstream end 260 of bottom wall 248 define opening 262 in first end 250 of third channel 240 that allows third cavity 206 to communicate with third channel 240. Similarly, downstream ends 264 and 266 of first and second sidewalls 242 and 244, respectively, of third channel 240, downstream end 268 of upper wall 246 and downstream end 270 of bottom wall 248 define opening 272 in second end 252 of third channel 240 so as to allow third channel 240 to communicate with detection cavity 206. Bottom wall 248 of third channel 240 is generally co-planar with bottom walls 124 and 204 of third well 120 and detection well 200, respectively.

It is noted that all of the surfaces of binding cavity 42, first channel 80, second cavity 50, second channel 160, third cavity 126, third channel 240 and detection cavity 206 of each of the plurality of extraction/detection devices 30 are hydrophobic. Further, for reasons hereinafter described, binding cavity 42, first channel 80, second cavity 50, second channel 160, third cavity 126, third channel 240 and detection cavity 206 of each of the plurality of extraction/detection devices 30 are axially spaced along a common axis 260.

Figures 7, 8:
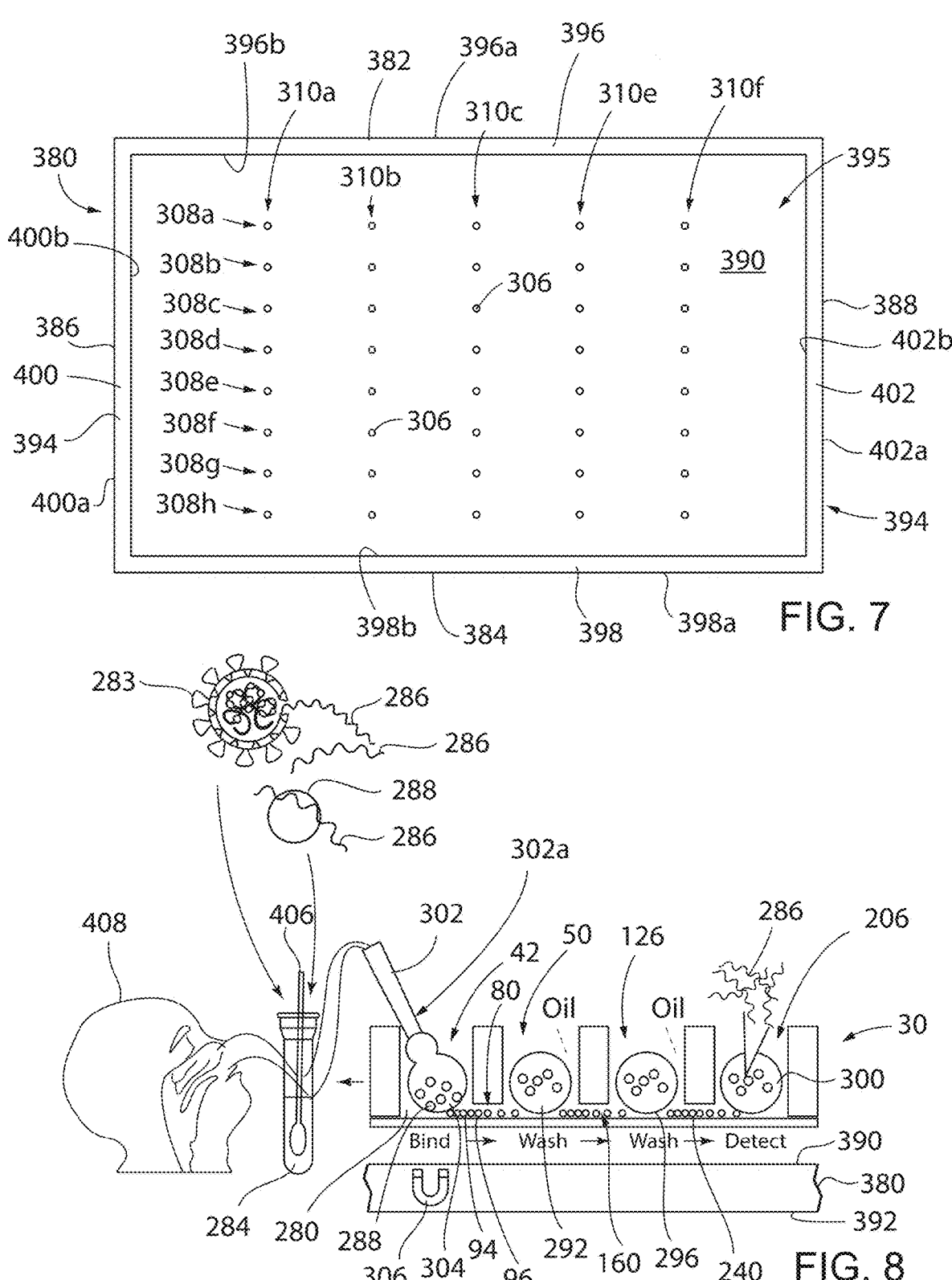
FIG. 7 is a top plan view of magnetic manipulation plate of the system of the present invention.
FIG. 8 is a schematic view showing the methodology of the present invention utilizing the system of FIG. 1.

Referring to FIGS. 1 and 7, system 10 further includes a magnetic manipulation plate generally designated by the reference numeral 380. Magnetic manipulation plate 380 is defined by first and second generally parallel, spaced side walls 382 and 384, respectively, interconnected by first and second generally parallel, spaced end walls 386 and 388, respectively. First and second side walls 382 and 384 respectively, and first and second end walls 386 and 388, respectively, are interconnected by upper and lower surfaces 390 and 392, respectively, FIG. 8. Border 394 projects from upper surface 390 of magnetic manipulation plate 380 adjacent the outer periphery thereof and defines microfluidic plate receipt cavity 395. Border 394 is defined by first and second side rails 396 and 398, respectively, and first and second end rails 400 and 402, respectively.

First side rail 396 includes an outer surface 396*a* co-planar with first side wall 382 of magnetic manipulation plate 380 and an inner surface 396*b* directed toward microfluidic plate receipt cavity 395. Second side rail 398 includes an outer surface 398*a* co-planar with second side wall 384 of magnetic manipulation plate 380 and an inner surface 398*b* directed toward microfluidic plate receipt cavity 395. Inner surface 396*b* of first side rail 396 and inner surface 398*b* of second side rail 398 are generally parallel to each other and spaced by a distance generally equal to the distance between first and second side walls 14 and 16, respectively, of microfluidic plate 12. It is intended for inner surface 396*b* of first side rail 396 and inner surface 398*b* of second side rail 398 to guide slidably movement of microfluidic plate 12 along upper surface 390 of magnetic manipulation plate 380, for reasons hereinafter described.

First end rail 400 includes an outer surface 400*a* co-planar with first end wall 386 of magnetic manipulation plate 380 and an inner surface 400*b* directed toward microfluidic plate receipt cavity 395. Second end rail 402 includes an outer surface 402*a* co-planar with second end wall 386 of magnetic manipulation plate 380 and an inner surface 402*b* directed toward microfluidic plate receipt cavity 395. Inner surface 400*b* of first end rail 400 and inner surface 402*b* of second side rail 402 are generally parallel to each other and spaced by a distance to define limits of slidable movement of microfluidic plate 12 along upper surface 390 of magnetic manipulation plate 380, for reasons hereinafter described.

Magnetic manipulation plate 380 further includes a magnet force generator(s) to generate magnetic fields for each of the plurality of extraction/detection devices 30, for reasons hereinafter described. By way of example, the magnetic force generator may take the form of a plurality of magnets 306 embedded in upper surface 390 thereof. The plurality of magnets 306 in upper surface 390 of magnetic manipulation plate 380 are arranged in eight (8) rows 308*a*-308*h* and five (5) columns 310*a*-310*e*. It is intended for each magnet 306 to be axially aligned with binding cavity 42 of a corresponding extraction/detection 30 with microfluidic plate 12 positioned on upper surface 390 of magnetic manipulation plate 380 within microfluidic plate receipt cavity 395 such that second end wall 20 of microfluidic plate 12 abuts inner surface 402*b* of second end rail 402, FIGS. 8-9.

Figures 9, 10, 11:
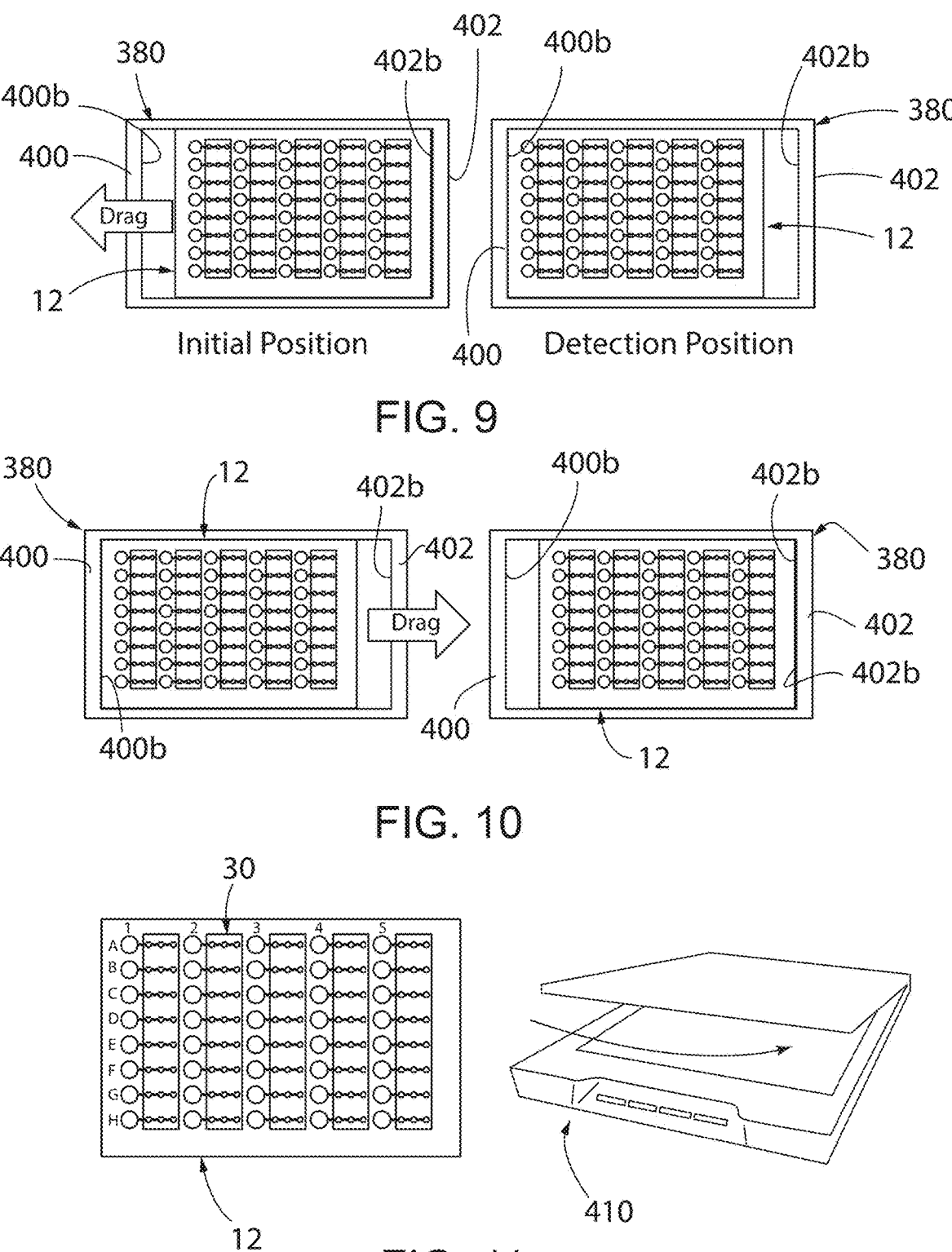
FIG. 9 is a top plan view of the system of FIG. 1 showing the microfluidic plate moving from an initial position to a detection position.
FIG. 10 is a top plan view of the system of FIG. 1 showing the microfluidic plate moving from the detection position back to initial position.
FIG. 11 is a schematic view showing the microfluidic plate of the system of the present invention being positioned in a plate reader.

In order to effectuate the methodology of the present invention, samples may be collected (e.g., by means of a nasal or throat swab 406 of a subject or by drawing a saliva or blood sample) from one or more subjects, FIG. 8. As best seen in FIGS. 8-9, binding cavity 42, first channel 80, second cavity 50, second channel 160, third cavity 126, third channel 240 and detection cavity 206 of each of the plurality of extraction/detection devices 30 are filled with a selected fluid, such as oil 280. It is noted that oil 280 flows through first, second and third channels 80, 160 and 240, respectively, via capillary action owing to the hydrophobic nature of the surfaces, i.e. an oleophilic version of capillary action. Referring back to FIGS. 5 and 8, with each of the plurality of extraction/detection devices 30 filled with oil 280, first pipet 290 is used to deliver drop 292 of an aqueous solution, e.g., ddH2O, into second cavity 50 of each of the plurality of extraction/detection devices 30. It is intended for the aqueous solution to wash away unbound analyte from functionalized paramagnetic beads 288 with the minimal loss of any targets 286 bound to functionalized paramagnetic beads 288. More specifically, first pipet 290 delivers drop 292 directly into oil 280 (in other words, tip 290*a* of first pipet 290 is submerged within oil 280) in second cavity 50. As such, it is contemplated for first pipet 290 to include a mechanism for urging drop 292 out of tip 290*a* thereof.

It is contemplated for the aqueous solution of drop 292 and oil 280 to have a first interfacial tension. Similarly, the aqueous solution of drop 292 and the surfaces microfluidic plate 12 (including sidewall 46 and bottom wall 48 defining second well 44) have a second interfacial tension and oil 280 and the surfaces of microfluidic plate 12 have a third interfacial tension. The second interfacial tension is greater than or equal to the sum of the first interfacial tension and the third interfacial tension, thereby giving rise to liquid repellency between drop 292 and the surfaces of microfluidic plate 12.

It is noted collar 56 prevents tip 290*a* of first pipet 290 from entering the entirety of second cavity 50, FIG. 6, and engaging bottom wall 48. As such, collar 56 prevents the accidental pipetting of drop 292 of the aqueous solution into first and second channels 80 and 160, respectively. The accidental pipetting of drop 292 of the aqueous solution into first and second channels 80 and 160, respectively, may occur if tip 290*a* of first pipet 290 is inserted into second cavity 50 at an angle such that tip 290*a* of first pipet 290 is adjacent opening 112 in first channel 80 or opening 182 in second channel 160. Likewise, collar 56 prevents drop 292 of the aqueous solution from accidentally escaping from second cavity 50, as long as the diameter of drop 292 is greater than the dimensions of opening 76 in collar 56.

Further, the non-circular configuration of collar 56 minimizes the points of contact between tip 290*a* of first pipet 290, which has a circular cross-section, and upper edge 74 of collar 56. More specifically, tip 290*a* of first pipet 290 engages collar 56 at intersections 63 and 65, respectively, of first and second loop portions 59 and 61, respectively, thereby preventing tip 290*a* of first pipet 290 from getting stuck within opening 76 in collar 56 when tip 290*a* of first pipet 290 is inserted into second cavity 50. In addition, the non-circular configuration of collar 56 prevents tip 290*a* of first pipet 290 from sealing against upper edge 74 of collar 56. As such, the spacing between inner surface 66 of sidewall 58 of collar 56 (and/or upper edge 74 of collar 56) and tip 290*a* of first pipet 290 allows oil to escape from second cavity 50 when drop 292 is delivered into second cavity 50.

It is noted that drop 292 has a diameter greater than the dimension of opening 112 in second end 102 of first channel 80 such that sidewall 46 of second well 44 prevents drop 292 from flowing into first channel 80. Similarly, drop 292 has a diameter greater than the dimension of opening 182 at first end 170 of second channel 160 such that sidewall 46 of second well 44 prevents drop 292 from flowing into second channel 160.

Second pipet 294 is used to deliver drop 296 of an aqueous/wash solution, e.g., EtOH, into third cavity 126 of each of the plurality of extraction/detection devices 30. It is intended for the wash solution to wash away any proteins unbound to functionalized paramagnetic beads 288 with the minimal loss of any targets 286 bound to functionalized paramagnetic beads 288. More specifically, second pipet 294 delivers drop 296 directly into oil 280 (in other words, tip 294a of second pipet 294 is submerged within oil 280) in third cavity 126. As such, it is contemplated for second pipet 294 to include a mechanism for urging drop 296 out of tip 294a thereof.

It is contemplated for the aqueous solution of drop 296 and oil 280 to have a fourth interfacial tension. Similarly, the aqueous solution of drop 296 and the surfaces of microfluidic plate 12 (including sidewall 122 and bottom wall 124 defining second well 120) have a fifth interfacial tension and oil 280. The fifth interfacial tension is greater than or equal to the sum of the fourth interfacial tension and the third interfacial tension, thereby giving rise to liquid repellency between drop 296 and the surfaces of microfluidic plate 12, (including sidewall 122 and bottom wall 124 defining second well 120).

Collar 130 prevents tip 294a of second pipet 294 from entering the entirety of third cavity 124 and engaging bottom wall 124. Collar 130 also prevents drop 296 of the elution solution from accidentally escaping from third cavity 126 (as long as the diameter of drop 296 is greater than the dimensions of opening 156 in collar 130). Further, the non-circular configuration of collar 130: 1) minimizes the points of contact between tip 294a of second pipet 294, which has a circular cross-section, and upper edge 154 of collar 130, thereby preventing tip 294a of second pipet 294 from getting stuck within opening 156 in collar 130 when tip 294a of second pipet 294 is inserted into third cavity 126; and 2) prevents tip 294a of second pipet 294 from sealing against upper edge 154 of collar 130. As such, the spacing between inner surface 146 of sidewall 132 of collar 130 (and/or upper edge 154 of collar 130) and tip 294a of second pipet 294 allows oil 280 to escape from third cavity 126 when drop 296 is delivered into third cavity 126.

It is noted that drop 296 has a diameter greater than the dimension of opening 192 in second end 172 of second channel 160 such that sidewall 122 of third well 120 prevents drop 296 from flowing into second channel 160. Similarly, drop 296 has a diameter greater than the dimension of opening 262 at first end 250 of third channel 240 such that sidewall 122 of third well 200 prevents drop 296 from flowing into third channel 240.

Third pipet 298 is used to deliver drop 300 of a reaction solution into detection cavity 206 of each of the plurality of extraction/detection devices 30. It is contemplated for a parameter of the reaction solution drop to change in response to the presence of target 286, thereby allowing detection of target 286 in a cell 280 from a collected sample. For example, if drop 300 of the reaction solution includes an isothermal nucleic acid amplification reagent, a change in color, fluorescence intensity, absorbance, or precipitation of drop 300 will occur in response to the presence of target 286. To facilitate understanding of the present invention, a colorimetric loop-mediated isothermal amplification (LAMP) solution is used as an exemplary reaction solution in system 10 and methodology of the present invention. However, it can be appreciated that drop 300 may be formed from other reaction solutions, including those that do not cause the release of target 286 from functionalized paramagnetic beads 288 and/or require the heating of drop 300 hereinafter described, without deviating from the scope of the present invention.

As is known, a thermal change of the LAMP solution provides a visible indicator (e.g. a color change) in response to the presence of the desired target, e.g., target 286. More specifically, drop 300 of the LAMP solution is provided detection cavity 206 of each of the plurality of extraction/ detection devices 30. Third pipet 298 delivers drop 300 directly into oil 280 (in other words, tip 298a of third pipet 298 is submerged within oil 280) in detection cavity 206. As such, it is contemplated for third pipet 298 to include a mechanism for urging drop 300 out of tip 298a thereof.

It is contemplated for the reaction solution of drop 300 and oil 280 to have a sixth interfacial tension. Similarly, the reaction solution of drop 300 and the surfaces of microfluidic plate 12 (including sidewall 202 and bottom wall 204 defining third well 200) have a seventh interfacial tension. The seventh interfacial tension is greater than or equal to the sum of the sixth interfacial tension and the third interfacial tension, thereby giving rise to liquid repellency between drop 300 and the surfaces of microfluidic device 12 (including sidewall 202 and bottom wall 204 defining second well 200).

Collar 210 prevents tip 298a of third pipet 298 from entering the entirety of detection cavity 206 and engaging bottom wall 204. Collar 210 also prevents drop 300 of the LAMP solution from accidentally escaping from detection cavity 206 (as long as the diameter of drop 300 is greater than the dimensions of opening 236 in collar 210). Further, the non-circular configuration of collar 210: 1) minimizes the points of contact between tip 298a of third pipet 298, which has a circular cross-section, and upper edge 234 of collar 210, thereby preventing tip 298a of third pipet 298 from getting stuck within opening 236 in collar 210 when tip 298a of third pipet 298 is inserted into detection cavity 206; and 2) prevents tip 298a of third pipet 298 from sealing against upper edge 234 of collar 210. As such, the spacing between inner surface 226 of sidewall 212 of collar 210 (and/or upper edge 234 of collar 210) and tip 298a of third pipet 298 allows oil 280 to escape from detection cavity 206 when drop 300 is delivered into detection cavity 206.

With each of the plurality of extraction/detection devices 30 filled with oil 280 and with drops 292, 296 and 300 deposited in corresponding second, third and detection cavities 50, 126 and 206, respectively, each sample is deposited in corresponding lysis buffer 284, FIG. 8, to extract target 286 of interest (e.g., genetic material such as DNA/RNA) from cell 280 from each collected sample. Functionalized paramagnetic beads 288 are added to lysis buffer 284 for each sample such that target 286, if any, binds thereto. Thereafter, fourth pipet 302 delivers drop 304 of lysis buffer 284 for each sample including functionalized paramagnetic beads 288 into binding cavity 42 of a corresponding one of the plurality of extraction/detection devices 30. In other words, each of the plurality of extraction/detection devices 30 receives drop 304 from a different sample. More specifically, fourth pipet 302 may be used to deliver drop 304 directly into oil 280 (in other words, tip 302a of fourth pipet 302 may be submerged within oil 280) in binding cavity 42. Alternatively, fourth pipet 302 may release drop 304 above oil 280, thereby allowing gravity to bring drop 304 into oil 280 in binding cavity 42. This arrangement is only suitable for conditions wherein drop 304 is sufficiently dense relative to oil 280. It can be understood that a person having ordinary skill in the art could determine the conditions under which this is achievable either by computational methods or by routine experimental optimization. In either instance described above, fourth pipet 302 may include a mechanism for urging drop 304 out of tip 302a thereof. It is noted that drop 304 has a diameter greater than the dimension of opening 98 at first end 100 of first channel 80 such that sidewall 38 of binding well 36 prevents drop 304 from flowing into first channel 80.

It is contemplated for the lysis buffer of drop 304 and oil 280 to have an eighth interfacial tension. Similarly, the lysis buffer of drop 304 and the surfaces of microfluidic plate 12 (including sidewall 38 and bottom wall 40 defining binding well 36) have a ninth interfacial tension. The ninth interfacial tension is greater than or equal to the sum of the eighth interfacial tension and the third location interfacial tension, thereby giving rise to liquid repellency between drop 304 and the surfaces of microfluidic plate 12 (including sidewall 38 and bottom wall 40 defining binding well 36).

Once drops 292, 296, 300 and 304 are deposited into the plurality of extraction/detection devices 30, as heretofore described, microfluidic plate 12 is positioned on upper surface 290 of magnetic manipulation plate 380 within microfluidic plate receipt cavity 295 such that second end wall 20 of microfluidic plate 12 abuts inner surface 402*b* of second end rail 402, FIG. 9. As heretofore described, with microfluidic plate 12 received with microfluidic plate receipt cavity 295 of magnetic manipulation plate 380 such that second end wall 20 of microfluidic plate 12 abuts inner surface 402*b* of second end rail 402, each magnet 306 embedded in upper surface 390 of magnetic manipulation plate 380 is axially aligned with a corresponding binding cavity 42 of a corresponding extraction/detection device 30 such that the magnetic force generated by each magnet 306 attracts the target-bound functionalized paramagnetic beads 288 in corresponding drops 304, FIG. 8.

Thereafter, magnetic plate 12 is slid along upper surface 390 of magnetic manipulation plate 380 toward first end rail 400 to a position such that each magnet 306 is below and axially aligned with second cavity 50. The magnetic force generated by each magnet 306 draws the target-bound functionalized paramagnetic beads 288 in a corresponding one of the plurality of extraction/detection devices 30 from drop 304 in binding well, through first channel 80, into drop 292 in second cavity 50. Due to the immiscible characteristics of oil 280 and lysis buffer 284, the lysis buffer 284 is removed from target-bound functionalized paramagnetic beads 288, thereby greatly reducing the residual lysis buffer 284 adsorbed on target-bound functionalized paramagnetic beads 288. With target-bound functionalized paramagnetic beads 288 received in drop 292, the buffer solution comprising drop 292 washes away any unbound material with the minimal loss of the targets bound to target-bound functionalized paramagnetic beads 288.

Once target-bound functionalized paramagnetic beads 288 is washed in droplet 292, magnetic plate 12 is slid along upper surface 390 of magnetic manipulation plate 380 toward first end rail 400 to a position such that each magnet 306 is below and axially aligned with third cavity 126. The magnetic force generated by each magnet 306 draws the target-bound functionalized paramagnetic beads 288 in a corresponding one of the plurality of extraction/detection devices 30 from drop 292 in second cavity 50, through second channel 160, into drop 296 in third cavity 126. Due to the immiscible characteristics of oil 280 and aqueous solution from which drop 296 is comprised, the aqueous solution is removed from target-bound functionalized paramagnetic beads 288, thereby greatly reducing the residual aqueous solution on target-bound functionalized paramagnetic beads 288. With target-bound functionalized paramagnetic beads 288 received in drop 296, the washing solution comprising drop 296 washes away any proteins unbound to functionalized paramagnetic beads 288 with the minimal loss of the targets bound to target-bound functionalized paramagnetic beads 288.

Once the target-bound functionalized paramagnetic beads 288 are washed in drop 296, magnetic plate 12 is slid along upper surface 290 of magnetic manipulation plate 380 toward first end rail 400 to a detection position such that each magnet 306 is below and axially aligned with detection cavity 206, FIG. 9. The magnetic force generated by each magnet 306 draws the target-bound functionalized paramagnetic beads 288 in a corresponding one of the plurality of extraction/detection devices 30 from drop 296 in third cavity 126, through third channel 240, into drop 300 in detection cavity 206. Due to the immiscible characteristics of oil 280 and the washing solution from which drop 296 is comprised, the washing solution is removed from target-bound functionalized paramagnetic beads 288.

With target-bound functionalized paramagnetic beads 288 received in drop 304, the reaction solution comprising drop 300 causes target 286 to unbind from functionalized paramagnetic beads 288. It is noted that due to the low sensitivity of the reaction solution, it is necessary that the volume of drop 304 of lysis buffer 284 for each sample must be greater than the volume of drop 300 of the reaction solution. As such, diameter D1 of binding cavity 42 is greater than the diameters D2, D3 and D4 of second, third and detection cavities 50, 126 and 206, respectively. After target 286 unbinds from functionalized paramagnetic beads 288 in detection cavity 206, magnetic plate 12 is slid along upper surface 390 of magnetic manipulation plate 380 toward second end rail 402 such that each magnet 306 is below and axially aligned with binding cavity 46, FIG. 10, thereby drawing functionalized paramagnetic beads 288 from detection cavity 206 and leaving target 286, if any, in drop 304.

Once microfluidic plate 12 is returned to its initial position, microfluidic plate 12 is removed from microfluidic plate receipt cavity 295 of magnetic manipulation plate 380 and transferred to a heating source, e.g., an oven, hot plate, or flatbed thermal cycler. Microfluidic plate 12, and more specifically drop 300 in detection cavity 206, is heated at a predetermined temperature (e.g., 65° C.) for a predetermined time period. It can be understood that in response to the presence of the desired target 360 in drop 300, the heating of drop 300 will cause drop 300 to change color. Hence, detection of target 286 in a sample can be done via visual inspection, a flatbed scanner, a camera, a mobile device with a camera, and/or a plate reader 410, FIG. 11, thereby freeing system 10 to process additional samples.

It can be appreciated that system 10 and the methodology heretofore described allows for multiple samples to be quickly and easily tested for the presence of a target, e.g, SARS-COV-2. In the described embodiment, forty (40) samples may be tested simultaneously (one sample tested in each of the plurality of extraction/detection devices 30 arranged in eight (8) rows 32*a*-32*h* and five (5) columns 34*a*-34*e* on microfluidic plate 12). It can be appreciated that other configurations of system 10 allowing for virtually limitless number of samples being tested simultaneously is possible, with minor modifications.

Figure 12:
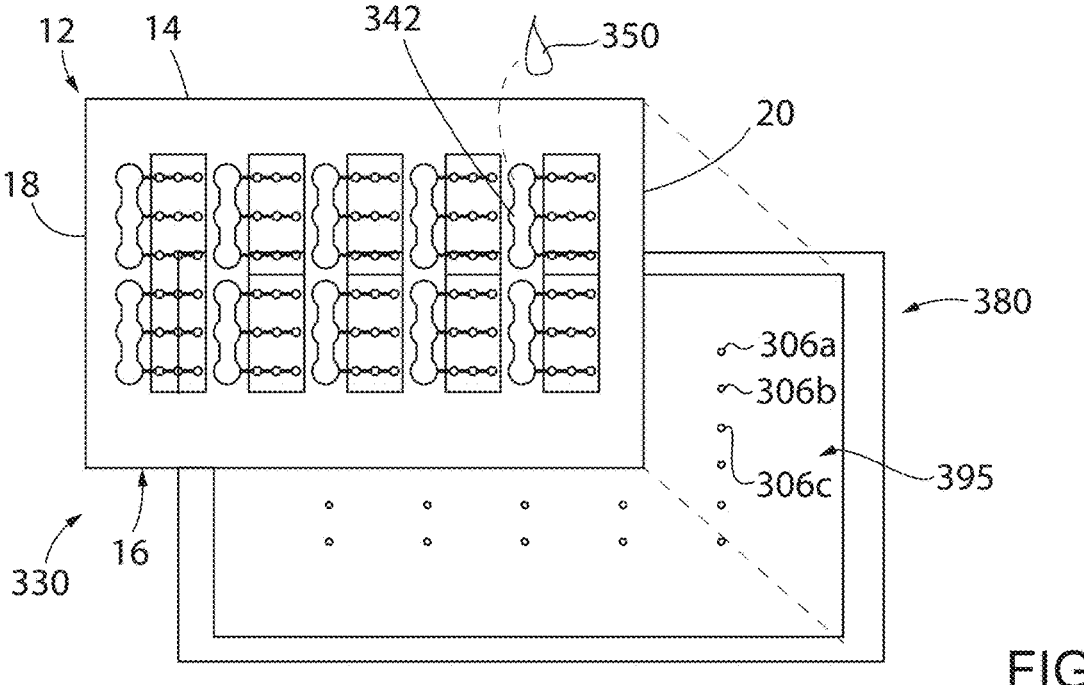
FIG. 12 is an exploded, schematic view of an alternate system for effectuating the methodology of the present invention.
Figure 13:
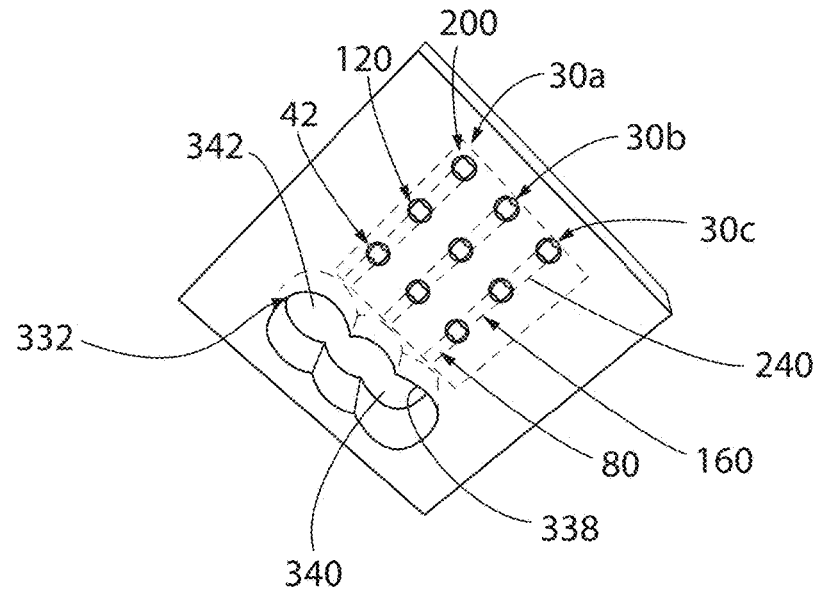
FIG. 13 is an isometric view of an individual extraction/detection device on the microfluidic plate of the system of FIG. 12.

Referring to FIGS. 12-13, an alternate embodiment of a system in accordance with the present invention is generally designated by the reference numeral 330. Except as hereinafter provided, system 330 is identical in structure to system 10. As such, common reference characters are used to identify common components. More specifically, in system 330, it is contemplated to replace binding wells 46 in multiple adjacent extraction/detection devices 30 in microfluidic plate 12 (e.g., extraction/detection devices 30*a*-30*c*) with a single common binding well 332. Binding well 332 is defined by sidewall 338 and closed bottom wall 340. Inner surface 338a of sidewall 338 and inner surface 340a of bottom wall 340 define binding cavity 342 for receiving a sample therein, as hereinafter described. Binding well 332 and second wells 44 of extraction/detection devices 30a-30c are interconnected by first channels 80 of extraction/detection devices 30a-30c. More specifically, openings 98 in first ends 100 of first channels 80 of extraction/detection devices 30a-30c communicate with binding cavity 342

In operation, extraction/detection devices 30a-30c are filled with oil 280 and drops 292, 296 and 300 deposited in corresponding second, third and detection cavities 50, 126 and 206, respectively, of each extraction/detection device 30a-30c, as heretofore described. Drops 292, 296 and 300 have interfacial tensions with oil 280 and with the surfaces defining second, third and detection wells 44, 120 and 200, respectively. The interfacial tensions between drops 292, 296 and 300 and the surfaces of microfluidic plate 12, including the surfaces defining second, third and detection wells 44, 120 and 200, respectively) is greater than or equal to the interfacial tensions between drops 292, 296 and 300 and oil 280 and between oil 280 and the surfaces of microfluidic plate 12, thereby giving rise to liquid repellency between drops 292, 296 and 300 and the surfaces defining second, third and detection wells 44, 120 and 200, respectively.

A sample is deposited in corresponding lysis buffer 284 to extract target 286 of interest (e.g., RNA) from cell 280 therefrom. Functionalized paramagnetic beads 288 are added to lysis buffer 284 for each sample such that target 286 binds thereto. Thereafter, fourth pipet 302 delivers drop 350 of lysis buffer 284 into binding cavity 342.

Fourth pipet 302 may be used to deliver drop 350 directly into oil 280 (in other words, tip 302a of fourth pipet 302 may be submerged within oil 280) in binding cavity 342. Alternatively, fourth pipet 302 may release drop 350 above oil 280, thereby allowing gravity to bring drop 350 into oil 280 in binding cavity 342. This arrangement is only suitable for conditions wherein drop 304 is sufficiently dense relative to oil 280. It can be understood that a person having ordinary skill in the art could determine the conditions under which this is achievable either by computational methods or by routine experimental optimization. In either instance described above, fourth pipet 302 may include a mechanism for urging drop 350 out of tip 302a thereof. It is noted that drop 350 has a diameter greater than the dimension of openings 98 at first ends 100 of first channels 80 of extraction/detection devices 30a-30c such that sidewall 338 defining binding well 332 prevents drop 350 from flowing into first channels 100 of extraction/detection devices 30a-30c.

It is noted that drop 350 has an interfacial tension with oil 280 and with the surfaces of microfluidic plate 12 (including sidewall 338 and bottom wall 340 defining binding well 332). The interfacial tension between drop 350 and the surfaces defining microfluidic plate 12, including binding well 332, is greater than or equal to the interfacial tensions between drop 350 and oil 280 and between oil 280 and the surfaces defining microfluidic plate 12, including binding well 332, thereby giving rise to liquid repellency between drop 350 and the surfaces of microfluidic plate 12.

Once drops 292, 296, 300 and 350 are deposited into extraction/detection devices 30a-30c, as heretofore described, microfluidic plate 12 is positioned on upper surface 390 of magnetic manipulation plate 380 within microfluidic plate receipt cavity 395 such that second end wall 20 of microfluidic plate abuts inner surface 402b of second end rail 400. With microfluidic plate 12 positioned within microfluidic plate receipt cavity 395 of magnetic manipulation plate 380 such that second end wall 20 of microfluidic plate 12 abuts inner surface 402b of second end rail 402: 1) first, second and third magnets 306a-306c embedded in upper surface 390 of magnetic manipulation plate 380 are axially aligned with binding cavity 342; and 2) each of the first, second and third magnets 306a-306c lie in corresponding, common plane with the axes of first and second channels 80 and 160, respectively, of extraction/detection devices 30a-30c. The magnetic forces generated by magnets 306a-306c attract the target-bound functionalized paramagnetic beads 288 in corresponding drop 350.

Thereafter, magnetic plate 12 is slid along upper surface 290 of magnetic manipulation plate 380 toward first end rail 400 to a position such that each magnet 306a-306c is below and axially aligned with a corresponding second cavity 50 of each extraction/detection devices 30a-30c. The magnetic forces generated by each magnet 306a-306c draw portions of the target-bound functionalized paramagnetic beads 288 from drop 350 in binding well 332, through first channels 80, into drop 292 in second cavity 50 in each extraction/detection devices 30a-30c. Due to the immiscible characteristics of oil 280 and lysis buffer 284, the lysis buffer 284 is removed from target-bound functionalized paramagnetic beads 288, thereby greatly reducing the residual lysis buffer 284 adsorbed on target-bound functionalized paramagnetic beads 288.

Thereafter, as hereinafter described with respect to system 10, the magnetic forces generated by magnets 306a-306c draw the target-bound functionalized paramagnetic beads through each extraction/detection devices 30a-30c, from drop 292 in second cavity 50, through second channel 160, into drop 296 in third cavity 126, through third channel 240 and into drop 300 in detection cavity 206. With target-bound functionalized paramagnetic beads 288 received in drops 300 of extraction/detection devices 30a-30c, the LAMP solution comprising drops 300 causes any targets 286 to unbind from functionalized paramagnetic beads 288. Thereafter, magnetic plate 12 is slid along upper surface 290 of magnetic manipulation plate 380 toward first end rail 400 to its initial position such that each magnets 306a-306c are below and axially aligned with binding cavity 346, thereby drawing functionalized paramagnetic beads 288 from detection cavities 206 of extraction/detection devices 30a-30c, and leaving target 286, if any, in drops 350.

Once microfluidic plate 12 is returned to its initial position, microfluidic plate 12 is removed from microfluidic plate receipt cavity 395 of magnetic manipulation plate 380 and transferred to a heating source, e.g., an oven, hot plate, or flatbed thermal cycler. Microfluidic plate 12, and more specifically drops 300 in detection cavities 206 of extraction/detection devices 30a-30c, are heated at a predetermined temperature (e.g., 65° C.) for a predetermined time period. It can be understood that in response to the heating, a drop 300 will change color if the desired target 286 is present therein. Hence, detection of target 286 in a sample can be done via visual inspection, a flatbed scanner, a camera, a mobile device with a camera, and/or a plate reader, thereby freeing system 330 to process additional samples. Further, it can be understood that system 330 allows for multiple tests for the target to be simultaneously conducted on a single sample, thereby potentially increasing the overall accuracy of the testing process.

Various modes of carrying out the invention are contemplated as being within the scope of the following claims particularly pointing out and distinctly claiming the subject matter that is regarded as the invention.

We claim:

1. A device for detecting a target in a biological sample, the target being connectable to a solid phase substrate, the device comprising:

a plate having upper and lower surfaces and including:
first, second and third spaced wells in the plate, each of the first, second and third spaced wells defining corresponding cavities which are fluidly connected and have dimensions;
a first collar projecting from the upper surface of the plate and defining a non-circular opening in communication with the cavity defined by the second well, the first collar configured to prevent a pipetting mechanism from engaging a bottom surface partially defining the cavity defined by the second well;
a magnetic manipulation plate including an upper surface defining a microfluidic plate receipt cavity for removably receiving the plate therein, the plate slidable within the microfluidic plate receipt cavity between a first binding position, a second position and a detection position; and
a magnet force generator for generating a magnetic force for attracting the solid phase substrate;
wherein:
the magnet force generator is axially aligned with the cavity defined by the first well with the plate in the first binding position;
the magnet force generator is axially aligned with the cavity defined by the second well with the plate in the second position; and
the magnet force generator is axially aligned with the cavity defined by the third well with the plate in the third detection position.

2. The device of claim 1 further comprising oil received in the cavities defined by of the first, second and third wells.

3. The device of claim 2 further comprising a drop of an aqueous solution received in the cavity defined by the second well and a drop of reaction solution in the cavity defined by the third well.

4. The device of claim 3 wherein the cavity defined by the first well is adapted for receiving a drop of the biological sample including solid phase substrate therein, the solid phase substrate being attracted to the magnetic force generated by the magnet with the plate in the first binding position.

5. The device of claim 4 wherein the magnetic force generator draws the solid phase substrate from the drop of the biological sample, through the oil and into the drop of the aqueous solution as the plate moves from the first binding position to the second position.

6. The device of claim 5 wherein the magnetic force generator draws the solid phase substrate from the drop of the aqueous solution, through the oil and into the drop of isothermal reaction solution as the plate moves from the second position to the third detection position.

7. The device of claim 4 wherein:
the drop of aqueous solution and the oil have a first interfacial tension, the drop of aqueous solution and the plate have a second interfacial tension, and the oil and the plate have a third interfacial tension;
the second interfacial tension is greater than or equal to the sum of the first interfacial tension and the third interfacial tension, thereby giving rise to liquid repellency between the drop of aqueous solution and the plate;

the drop of reaction solution and the oil have a fourth interfacial tension and the drop of reaction solution and the plate have a fifth interfacial tension;
the fifth interfacial tension is greater than or equal to the sum of the fourth interfacial tension and the third interfacial tension, thereby giving rise to liquid repellency between the drop of reaction solution and the plate;
the drop of the biological sample and the oil have a sixth interfacial tension and the drop of the biological sample and the plate have a seventh interfacial tension; and
the seventh interfacial tension is greater than or equal to the sum of the sixth interfacial tension and the third interfacial tension, thereby giving rise to liquid repellency between the drop of the biological sample and the plate.

8. The device of claim 1 wherein the plate includes a fourth well defining a cavity, the fourth well disposed between and in fluid communication with the cavities defined by the second and third wells.

9. The device of claim 8 wherein:
oil is received in the cavities defined by the first, second, third and fourth wells; and
a drop of a first aqueous solution received in the cavity defined by the second well, a drop of a second aqueous solution received in the cavity defined by the fourth well, and a drop of isothermal reaction solution in the cavity defined by the third well.

10. The device of claim 1 wherein the plate includes a second collar projecting from the upper surface of the plate and defining a non-circular opening in communication with the cavity defined by the third well.

11. The device of claim 1 wherein the dimension of the cavity defined by the first well is greater than the dimensions of the cavities defined by the second and third spaced wells.

12. The device of claim 1 wherein the first, second and third wells are defined by corresponding well surfaces, the well surfaces being hydrophobic.

13. A device for detecting a target in a biological sample, the target being connectable to a solid phase substrate, the device comprising:

a plate having upper and lower surfaces and including:
first, second and third spaced wells in the plate, each of the first, second and third spaced wells defining corresponding cavities which are fluidly connected and have dimensions;
a first channel interconnecting the cavity defined by the first well with the cavity defined by the second well;
a second channel interconnecting the cavity defined by the second well with the cavity defined by the third well; and
a first collar projecting from the upper surface of the plate and defining a non-circular opening in communication with the cavity defined by the second well, the first collar configured to prevent a pipetting mechanism from depositing a fluid directly into the first and second channels; and a magnet force generator for generating a magnetic force for attracting the solid phase substrate, one of the magnet force generator and the plate being movable between a first position wherein the magnetic force generator is aligned with the first well, a second position wherein the magnetic force generator is aligned with a second well, and a third position wherein the magnetic force generator is aligned with the third well;

wherein:

the well surfaces include a bottom surface; and the first collar is configured to prevent the pipetting mechanism from engaging the bottom surface of the second well.

14. The device of claim 13 further comprising a manipulation plate including an upper surface having the magnetic force generator embedded therein and defining a microfluidic plate receipt cavity for removably receiving the plate therein, the plate slidable within the microfluidic plate receipt.

15. The device of claim 13 wherein the plate includes a second collar projecting from the upper surface of the plate and defining a non-circular opening in communication with the cavity defined by the third well.

16. The device of claim 13 wherein the dimension of the cavity defined by the first well is greater than the dimensions of the cavities defined by the second and third spaced wells.

17. The device of claim 13 wherein the first, second and third wells are defined by corresponding well surfaces, the well surfaces being hydrophobic.

\*   \*   \*   \*   \*